United States Patent [19]

Martin et al.

[11] 4,418,817
[45] Dec. 6, 1983

[54] CONVEYOR CHAIN HAVING CARRIER ROLLERS

[75] Inventors: Donald E. Martin, Waukesha; Victor D. Petershack, Elm Grove, both of Wis.

[73] Assignee: Rexnord Inc., Milwaukee, Wis.

[21] Appl. No.: 284,263

[22] Filed: Jul. 17, 1981

[51] Int. Cl.³ ............................................. B65G 39/20
[52] U.S. Cl. ................................ 198/845; 198/851; 198/822
[58] Field of Search ............... 198/838, 845, 851, 853, 198/332, 822

[56] References Cited

U.S. PATENT DOCUMENTS

| | | | |
|---|---|---|---|
| 1,804,423 | 5/1931 | Krenzke | 198/845 |
| 1,824,756 | 9/1931 | Welser, Jr. | 198/845 |
| 2,033,863 | 3/1936 | Piron | 295/31 R |
| 2,590,567 | 3/1952 | Osborne | 295/16 |
| 2,905,308 | 9/1959 | Hansen | 198/332 |
| 3,706,371 | 12/1972 | Hirota | 198/838 |
| 3,842,970 | 10/1974 | Brenner et al. | 198/845 |
| 4,049,308 | 9/1977 | Martin | 295/16 |

Primary Examiner—Joseph E. Valenza
Assistant Examiner—Jonathan D. Holmes

[57] ABSTRACT

A carrier roller for use in a conveyor chain, including a bushing adapted to be mounted on a shaft. A resilient roller tire, having a tread, is rotatably mounted over the bushing. A load-limiting annular disk is rotatably mounted over the bushing adjacent the resilient roller tire and includes means for limiting the amount of radial load to be supported by the resilient roller tire.

11 Claims, 7 Drawing Figures

CONVEYOR CHAIN HAVING CARRIER ROLLERS

BACKGROUND OF THE INVENTION

This invention relates to chains, and more particularly, to chains which include carrier rollers for supporting the weight of articles conveyed by the chain.

The use of resilient roller tires in carrier rollers which travel over rails has been found to be preferable to metal rollers in many cases, because a resilient roller tire does less damage to the track and because a track is less likely to cut or scratch and thereby damage a resilient roller tire. There are, however, several problems which are encountered with resilient roller tires.

First, if intermittent large overloads are placed on resilient roller tires, due to something other than the articles conveyed by the chain such as, for example, trucks being driven across the conveyor, the resilient roller tires, and the bearings on which they are mounted, tend to fail under the excess load. The problem of intermittent excess loads has been solved in cargo rollers to some extent by the roller shown in U.S. Pat. No. 4,203,509 which is hereby incorporated by reference and referred to as "Thompson".

The Thompson roller has a resilient tire mounted on a tubular body having radial flanges at both ends, the central part of the tire bulging so that it has a larger diameter than the diameter of the flanges. When a large load is placed on the tire, the tire deforms until the load is sustained directly via the radial flanges. This is a fairly complicated construction, and the load sustained by the flanges is also sustained by the bearing, so the bearing receives no greater protection with the flanges than it would without them. Furthermore, it is impossible to replace a damaged flange without replacing the entire cargo roller. The present invention provides a carrier roller in which the resilient roller tire and the bearing in the resilient roller tire have improved protection against overload.

A second problem encountered in resilient roller tires having integral flanges is that the flange tends to flex relative to the tire tread, resulting in fatigue failure. The present invention solves or minimizes this problem by restricting flexure of the flange.

A third problem encountered in these conveyors involves the lack of support for the top plates which carry the articles being conveyed. In the prior art, such as shown in U.S. Pat. No. 3,842,970 "Brenner", which is hereby incorporated by reference, the rear portion of the top plate is supported by and welded to a pair of frame members on one chart carrier, and the front portion of the top plate is generally supported by the trailing portion of the preceding cart carrier. The contact with the preceding cart carrier is in a very narrow area along the frame members or landing pads of the leading cart carrier and does not provide enough support for extremely heavy loads. Furthermore, the top plates tend to misalign upon turning a corner or articulating over a sprocket and fail to properly realign, so that a smooth conveying surface is not provided for the articles being conveyed. The present invention provides more support for the top plates and provides guidance so that the plates tend to remain aligned during straight and laterally curving runs and to rapidly realign after passing over a sprocket.

SUMMARY OF THE INVENTION

The present invention provides a load-limiting annular disk rotatably mounted adjacent the resilient roller tire of the carrier roller so as to support large loads which exceed the rated capacity of the tire.

The present invention also provides a flexure-limiting annular disk mounted adjacent the flange of the flanged roller tire so as to limit the amount of lateral flexure of the flange away from the tire tread.

The present invention also provides a top plate support bar on the cart carrier adapted to support the top plate of the trailing cart carrier and to guide the top plate into alignment.

DESCRIPTION OF THE PREFERRED EMBODIMENTS

Figure 1:
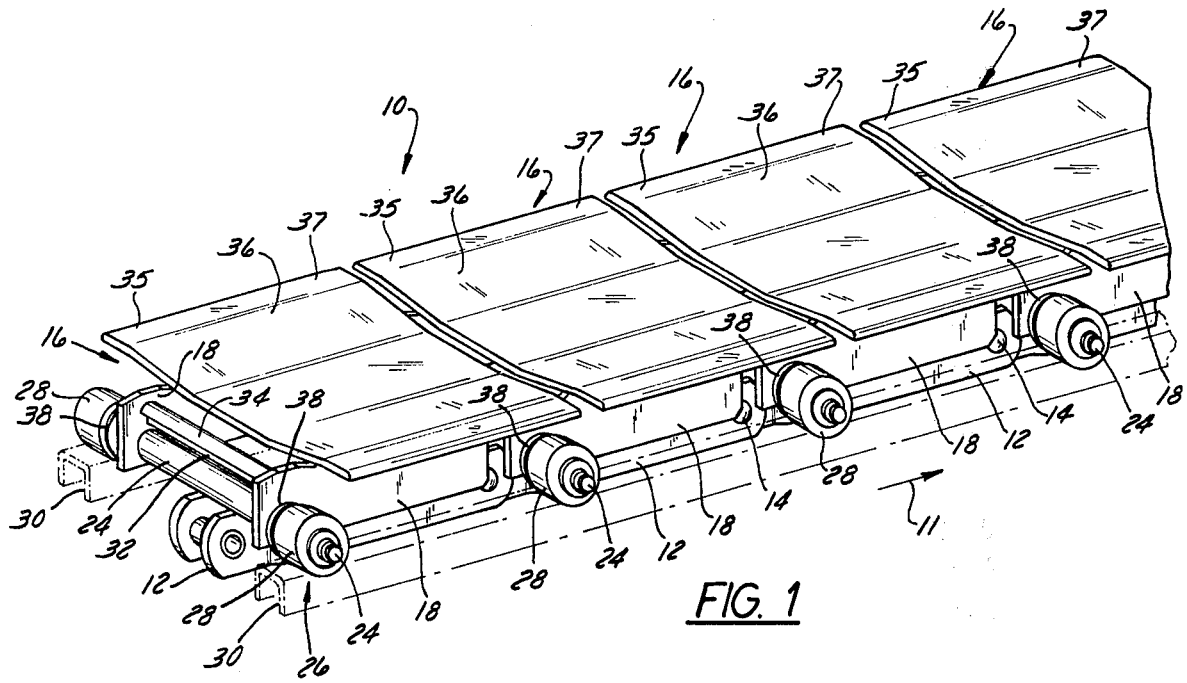
FIG. 1 is a broken away perspective view of a conveyor chain of the present invention showing a track in phantom.

FIG. 1 is a perspective view of conveyor chain 10. At the lowest vertical level of conveyor chain 10 is a plurality of chain links 12 which are interconnected by a plurality of pins 14 and which are adapted to be driven in the direction of arrow 11 by a sprocket (not shown). A cart carrier 16 is mounted on top of each chain link 12. Each cart carrier 16 is made up of a pair of frame members 18, which are commonly referred to in the art as outriggers. Another part of cart carrier 16 is bottom plate 20, which can be better seen in FIG. 4, and which extends across frame members 18 and is attached both to frame members 18 and to a chain link 12 by any suitable means, such as by a weld. Each frame member 18 defines an aperture 22 toward one end. An axle 24 extends between the pair of frame members 18 and through apertures 22. A pair of carrier rollers 26 is rotatably mounted on the axle 24, also making up part of the cart carrier 16.

Carrier rollers 26 are preferably of the general type described in U.S. Pat. No. 4,049,308, hereby incorporated by reference and referred to as "Martin", although other types of resilient roller tires could be utilized as well in this invention. Carrier rollers 26 include a resilient roller tire 28 adapted to roll on track 30 as shown in phantom in FIG. 1. Carrier rollers 26 support the weight of the cart carriers 16 and the weight of any articles which are conveyed by conveyor chain 10, thereby taking this force off of links 12. Carrier rollers 26 will be described in more detail later.

Figure 2:
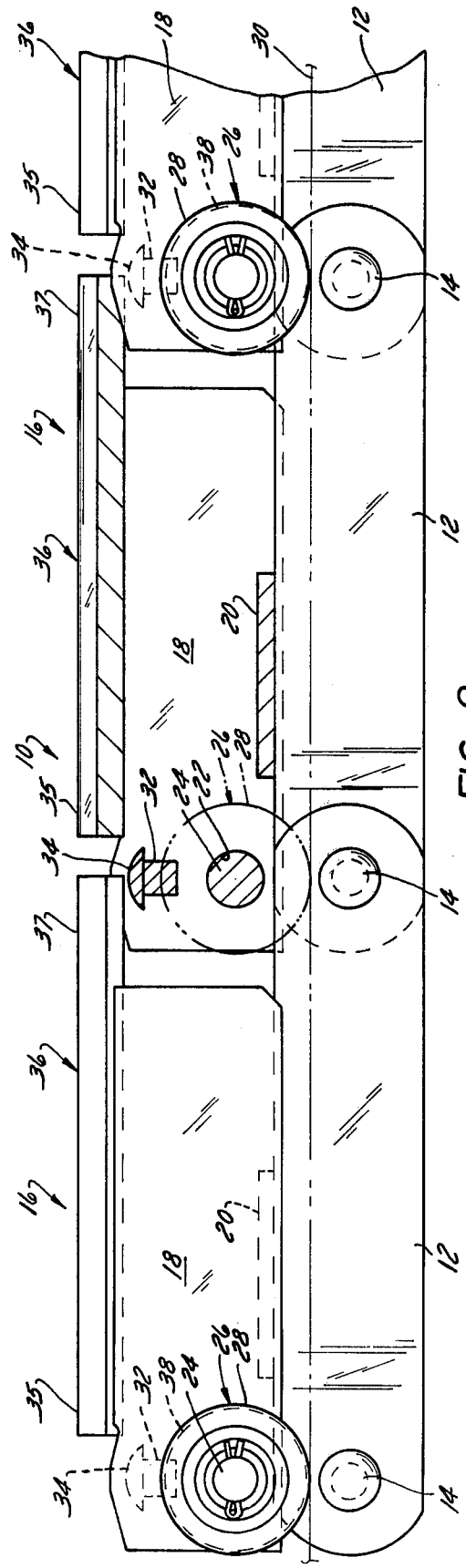
FIG. 2 is a broken away side view, partially in section, of the conveyor chain shown in FIG. 1.

Top plate support bar 32 is also a part of cart carrier 16 and can be seen most clearly in FIGS. 1 and 2. Top plate support bar 32 extends between the pair of frame members 18 and is attached at each end to one of frame members 18 by any conventional means, such as a weld. The top surface 34 of top plate support bar 32 has a half-oval shape and is located below the top surface of frame members 18.

Any articles to be carried by chain 10 will rest on top of top plate 36. The rear portion 35 of top plate 36 lies on top of and is attached by any conventional means, such as a weld, to the pair of frame members 18 of its cart carrier 16. The front end 37 of top plate 36 is supported by the top plate support bar 32 of the preceding cart carrier 16 and by the top surface of the frame members 18 of the preceding cart carrier 16. This well-distributed support minimizes the likelihood that top plate 36 will buckle under an overload, due, for example, to a truck driving over the conveyor.

Top plate 36 has a somewhat concave shape which conforms to the high top surface of frame members 18 and the lower top surface 34 of top plate support bar 32. The conforming shape of the supports causes top plate 36 to tend to be guided into its proper position, with the lowermost part of top plate 36 resting on the top surface 34 of top plate support bar 32 and between the higher frame members 18.

The portion of frame members 18 on which the front end 37 of top plate 36 rests is curved to permit smooth articulation of the conveyor chain 10 about a sprocket (not shown). The half-oval shape of the top portion of the top surface 34 of top plate support bar 32 also serves to permit smooth articulation.

FIG. 2 shows a side view of the conveyor chain 10 of FIG. 1.

Figure 3:
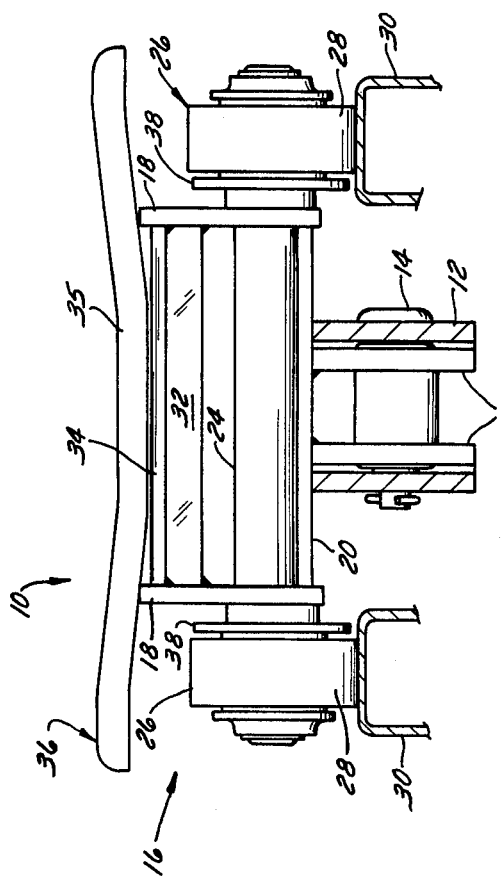
FIG. 3 is a front view of the conveyor chain shown in FIG. 1.

FIG. 3 is a front view of the conveyor chain 10 shown in FIG. 1 and provides a clearer view of how a top plate 36 of a trailing cart carrier 16 rests its front end 37 on the top plate support bar 32 and the frame members 18 of the preceding cart carrier 16. The attachment between bottom plate 20 and chain link 12 is also shown, and a clearer view of one embodiment of carrier rollers 26 is provided, including a view of load-limiting annular disk 38, which will be described later.

Figure 4:
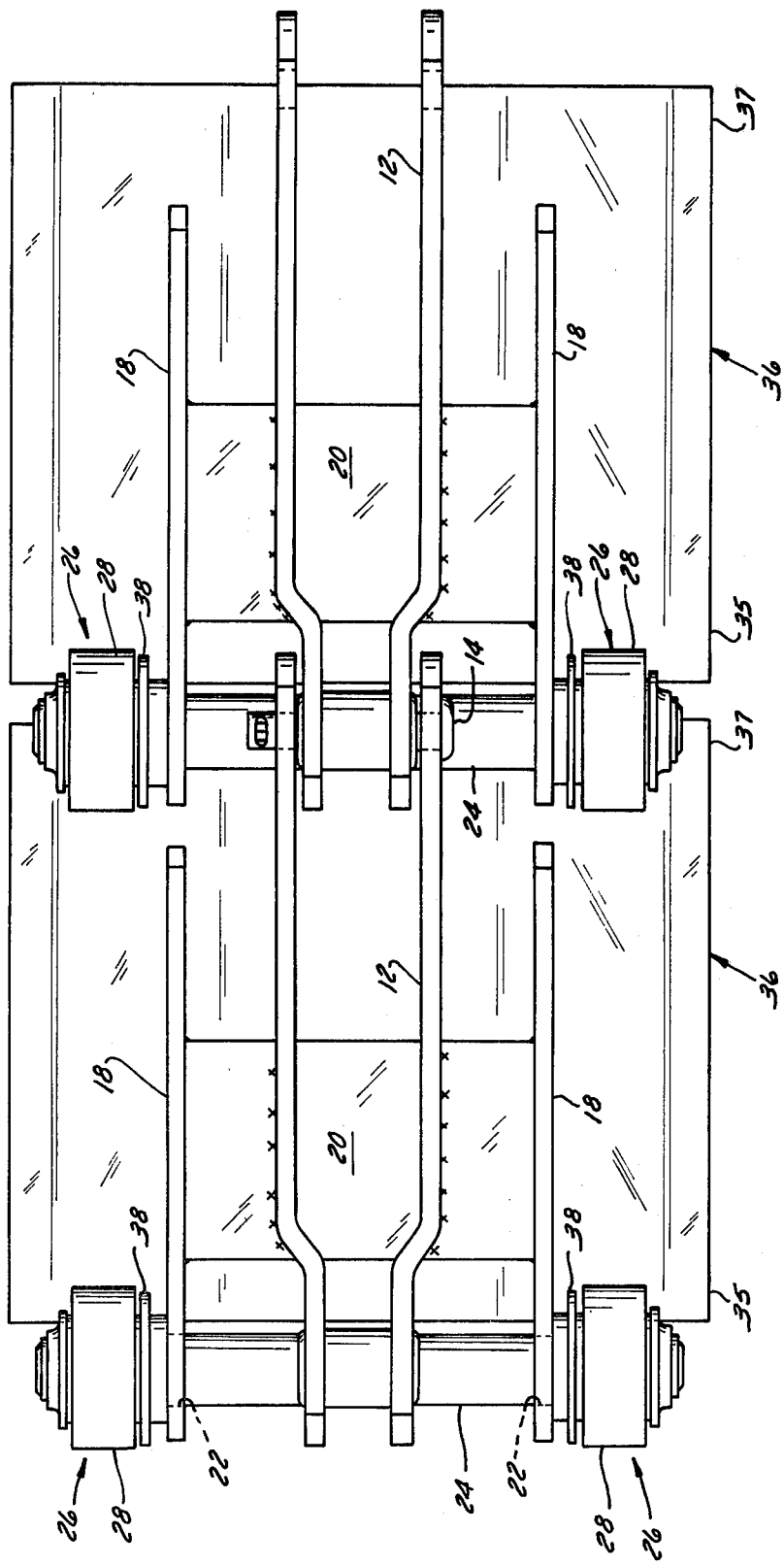
FIG. 4 is a bottom view of the conveyor chain shown in FIG. 1.

FIG. 4 is a bottom view of the conveyor 10 shown in FIG. 1, showing chain links 12, and showing how bottom plate 20 of cart carrier 16 is attached to chain 12.

Figure 5:
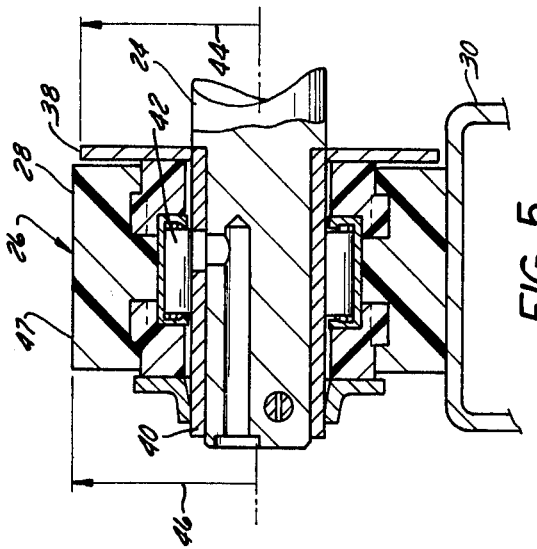
FIG. 5 is an enlarged front sectional view partially broken away of the embodiment of the carrier roller shown in FIG. 1.

FIG. 5 shows carrier roller 26 and load-limiting annular disk 38 in more detail. Bushing 40 is mounted on axle 24. Bearing 42 is rotatably mounted over bushing 40, and resilient roller tire 28 is mounted on bearing 42 so as to be rotatably mounted over bushing 40. For a more detailed description of carrier roller 26, reference should be made to the Martin patent, referred to above. Load-limiting annular disk 38 is rotatably mounted with a running fit over bushing 40 adjacent resilient roller tire 28 and includes means for limiting the amount of radial load which will be supported by resilient roller tire 28. The means for limiting radial load includes the load-limiting annular disk 38 having an outer radius 44 which is a predetermined amount smaller than the outer radius 46 of the tread 47 of resilient roller tire 28. The means for limiting radial load further includes load-limiting annular disk 38 being less resilient than resilient roller tire 38, such that it will support greater radial loads than resilient roller tire 28 with less deformation. For example, load-limiting annular disk 38 may be made of hardened steel. Since the outer radius 46 of tread 47 is greater than the outer radius 44 of load-limiting annular disk 38, tread 47 is the portion of carrier roller 26 which normally contacts track 30 to support loads placed on cart carrier 16. However, when a predetermined overload force is applied to resilient roller tire 28, such as from a truck driving across top plate 36, resilient roller tire 28 deforms, decreasing the outer radius 46 of tread 47 until outer radii 44, 46 are the same and load-limiting annular disk 38 contacts track 30. Load-limiting annular disk 38 then supports the overload, thereby protecting roller 28 and bearing 42. The particular embodiment shown in FIG. 5 was designed so that resilient roller tire 28 would support loads of up to 5,000 to 6,000 pounds and load-limiting annular disk 38 would support loads exceeding that amount.

Figure 6:
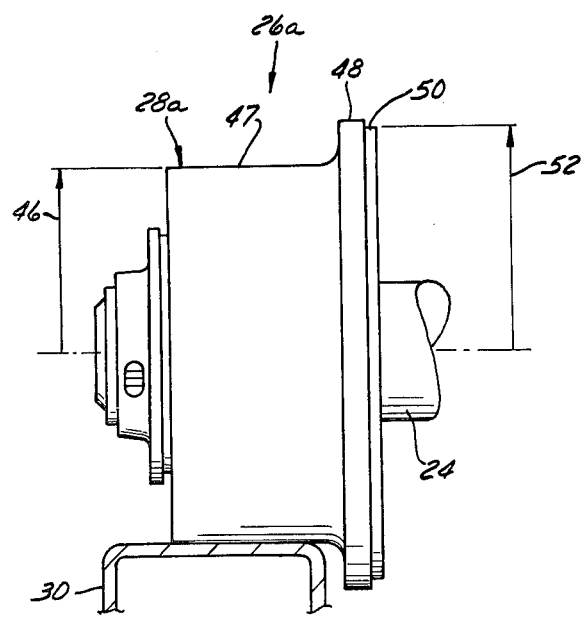
FIG. 6 is an enlarged front view partially broken away of a second embodiment of a carrier roller which can be used in the conveyor chain shown in FIG. 1.

FIG. 6 shows a second embodiment of carrier roller 26a. In this second embodiment resilient roller tire 28a is made up of tread 47 and integral flange 48 which functions to keep cart carrier 16 aligned on track 30. Flexure-limiting annular disk 50 is mounted over bushing 40 adjacent flange 48 and includes means for limiting the amount of lateral flexure of flange 48 away from tread 47. The means for limiting lateral flexure includes flexure-limiting annular disk 50 being less resilient than resilient roller tire 28a and having an outer radius 52 greater than the outer radius 46 of tread 47. When flange 48 begins to laterally flex away from tread 47 along the outer radius 46 of tread 47, it is stopped by flexure-limiting annular disk 50 which backs up flange 48 and is less resilient than flange 48 so as to limit flexure, thereby limiting fatigue failure of flanged resilient roller tire 28a.

Figure 7:
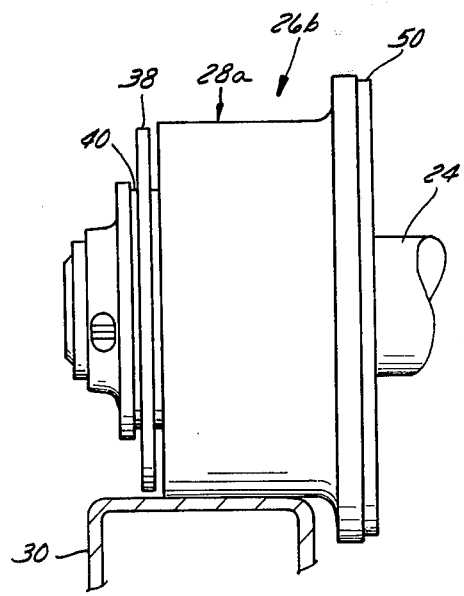
FIG. 7 is an enlarged front view partially broken away of a third embodiment of a carrier roller which can be used in the conveyor chain shown in FIG. 1.

FIG. 7 shows a third embodiment of carrier roller 26b. Carrier roller 26b is made up of a flanged resilient roller tire 28a, like that shown in FIG. 6, and includes a flexure-limiting annular disk 50. The difference between carrier roller 26b and carrier roller 26a is that carrier roller 26b also includes a load-limiting annular disk 38 which is rotatably mounted on bushing 40 and is adjacent resilient roller tire 28a. Load-limiting annular disk 38 in FIG. 7 performs the same function as did load-limiting annular disk 38 in FIG. 5.

Along with the combinations shown in the accompanying drawings, the carrier rollers shown in FIGS. 5, 6 and 7 may be used in a conveyor chain which does not have a top plate support bar, as well as in other conveyor chains known in the art. These and other combinations and modifications may be made without departing from the present invention, will be obvious to one skilled in the art, and are within the intended scope and spirit of the appended claims.

What is claimed is:
1. A conveyor chain, comprising:
a plurality of chain links;
a plurality of pins interconnecting said chain links;
a plurality of cart carriers mounted on top of said chain links, each cart carrier comprising:
 a. a pair of frame members defining a pair of apertures toward one end;
 b. an axle extending between said frame members and through said apertures;
 c. a pair of carrier rollers rotatably mounted on said axle;
 d. a top plate support bar extending between said pair of frame members above said axle and attached at each end to one of said frame members; and
 e. a top plate lying on top of and attached to said pair of frame members, the front end of said top plate extending beyond said frame members so as to be supported by the top plate support bar of the preceding cart carrier.

2. A conveyor chain as recited in claim 1, wherein the top surface of said top plate support bar has a half-oval shape.

3. A conveyor chain as recited in claim 2, wherein the top surface of said top plate support bar is below the top surface of said pair of frame members.

4. A conveyor chain as recited in claim 1 or 2, wherin each of said carrier rollers comprises:
   a bushing mounted on said axle;
   a resilient roller tire rotatably mounted over said bushing, said resilient roller tire having a tread; and
   a load-limiting annular disk rotatably mounted over said bushing adjacent said resilient roller tire including means for limiting the amount of radial load to be supported by said resilient roller tire.

5. A conveyor chain as recited in claim 4, wherein said means for limiting radial load includes said load-limiting annular disk having an outer radius which is a predetermined amount smaller than the outer radius of the tread of said resilient roller tire, such that, when said resilient roller tire is placed under a predetermined radial load, it deforms until its outer radius is the same as the outer radius of said load-limiting annular disk.

6. A conveyor chain as recited in claim 4, wherein said means for limiting radial load further includes said load-limiting annular disk being less resilient than said resilient roller tire, such that said load-limiting annular disk will support greater radial loads than said resilient roller tire with less deformation.

7. A conveyor chain as recited in claim 6, wherein said load-limiting annular disk is made of hardened steel.

8. A conveyor chain as recited in claim 6, wherein said resilient roller tire includes an integral flange, and further comprising:
   a flexure-limiting annular disk mounted over said axle adjacent said flange, including means for limiting the amount of lateral flexure of said flange away from said tread.

9. A conveyor chain as recited in claim 8, wherein said means for limiting lateral flexure comprises said flexure-limiting annular disk being less resilient than said resilient roller tire and having an outer diameter greater than the outer diameter of the tread of said resilient roller tire.

10. A conveyor chain as recited in claim 1 or 2, wherein each of said carrier rollers comprises:
    a bushing mounted on said axle;
    a resilient roller tire rotatably mounted over said bushing, said resilient roller tire including an integral tread and flange; and
    a flexure-limiting annular disk mounted over said bushing adjacent said flange, including means for limiting the amount of lateral flexure of said flange away from said tread.

11. A conveyor chain as recited in claim 10, wherein said means for limiting lateral flexure comprises said flexure-limiting annular disk being less resilient than said resilient roller tire and having an outer diameter greater than the outer diameter of the tread of said resilient roller tire.

* * * * *